(12) United States Patent
Spratt et al.

(10) Patent No.: US 9,371,953 B2
(45) Date of Patent: Jun. 21, 2016

(54) BASE FOR A GENERATOR

(71) Applicant: Caterpillar (NI) Limited, Larne (GB)

(72) Inventors: Gordon Spratt, Newtownabbey Antrim (GB); John Lawson, Belfast (GB)

(73) Assignee: Caterpillar (NI) Limited, Larne (IE)

( * ) Notice: Subject to any disclaimer, the term of this patent is extended or adjusted under 35 U.S.C. 154(b) by 0 days.

(21) Appl. No.: 14/415,771

(22) PCT Filed: Jun. 28, 2013

(86) PCT No.: PCT/GB2013/051727
§ 371 (c)(1),
(2) Date: Jan. 20, 2015

(87) PCT Pub. No.: WO2014/016556
PCT Pub. Date: Jan. 30, 2014

(65) Prior Publication Data
US 2015/0152996 A1   Jun. 4, 2015

(30) Foreign Application Priority Data
Jul. 27, 2012 (GB) .................................. 1213422.7

(51) Int. Cl.
*F16M 5/00* (2006.01)
*F02B 63/04* (2006.01)

(52) U.S. Cl.
CPC ................ *F16M 5/00* (2013.01); *F02B 63/044* (2013.01); *F05D 2240/91* (2013.01)

(58) Field of Classification Search
CPC . B65D 19/0002; F02M 63/04; F02M 37/007; F05D 2240/91; F16M 5/00; F02B 63/044
USPC ...................... 248/678, 346.01; 290/1 A, 1 R
See application file for complete search history.

(56) References Cited

U.S. PATENT DOCUMENTS

| 1,707,304 A | 4/1929 | Halvorsen |
| 4,835,405 A | 5/1989 | Clancey et al. |

(Continued)

FOREIGN PATENT DOCUMENTS

| CN | 202012700 | 10/2011 |
| CN | 202165761 | 3/2012 |

(Continued)

OTHER PUBLICATIONS

GB Search Report dated Aug. 22, 2013.
(Continued)

*Primary Examiner* — Anita M King

(57) ABSTRACT

A base made of a composite material supports a generator assembly. The base may support a number of components of the generator assembly, including an alternator, an engine, a control panel, a fuel tank, and a lifting frame. The base may include first and second tiers that are in two different horizontal planes for mounting of the alternator on one tier and the engine on the second tier, with a drive shaft of the alternator being aligned with a drive shaft of the engine. The base may include ribs extending from an under side of a support surface of the base in order to distribute loads and withstand stresses that result from the weight of the generator assembly.

17 Claims, 4 Drawing Sheets

(56) References Cited

U.S. PATENT DOCUMENTS

| | | | |
|---|---|---|---|
| 5,141,203 A | 8/1992 | Baker et al. | |
| 5,961,093 A | 10/1999 | Jones et al. | |
| 6,039,009 A | 3/2000 | Hirose | |
| 6,186,468 B1 * | 2/2001 | Schlegel | F16M 5/00 248/346.01 |
| 6,492,740 B2 | 12/2002 | Suzuki | |
| 7,107,943 B2 | 9/2006 | Yasuda et al. | |
| 7,779,793 B2 | 8/2010 | Ito et al. | |
| 7,902,705 B2 | 3/2011 | Gravlin et al. | |
| 8,152,129 B2 * | 4/2012 | Hermans | B65D 19/0002 248/346.01 |
| 8,546,963 B2 * | 10/2013 | Peacock | F02B 63/04 123/3 |
| 2002/0069840 A1 | 6/2002 | Bohm, II | |
| 2005/0040308 A1 | 2/2005 | Sweeney et al. | |
| 2006/0157988 A1 | 7/2006 | Mazuka et al. | |
| 2009/0302185 A1 | 12/2009 | Rowland | |
| 2010/0207004 A1 * | 8/2010 | Hermans | B65D 19/0002 248/346.01 |
| 2010/0264669 A1 * | 10/2010 | Peacock | F02B 63/04 290/1 R |
| 2011/0306262 A1 | 12/2011 | Arpin | |
| 2015/0207383 A1 * | 7/2015 | Spratt | F02M 37/007 290/1 A |

FOREIGN PATENT DOCUMENTS

| | | |
|---|---|---|
| JP | 2007-302746 | 11/2007 |
| WO | WO 2007/068036 | 6/2007 |
| WO | WO 2009/026632 | 3/2009 |
| WO | WO 2014/016556 | 1/2014 |

OTHER PUBLICATIONS

International Search Report dated Sep. 24, 2013.

* cited by examiner

BASE FOR A GENERATOR

CLAIM FOR PRIORITY

This application is a U.S. National Phase entry under 35 U.S.C. §371 from PCT International Application No. PCT/GB2013/051727, filed Jun. 28, 2013, which claims benefit of priority of United Kingdom Patent Application No. 1213422.7, filed Jul. 27, 2012, all of which are incorporated herein by reference.

TECHNICAL FIELD

The present disclosure relates to a base for a generator, and more particularly to a base made of composite material.

BACKGROUND

Electrical generator commonly comprises a prime mover (usually a gasoline-powered internal combustion engine), an alternator, a fuel tank, controls and other electronics all supported on a base. A primary purpose of the base is to carry the above components in a single package, while elevating the same above the ground. The base, generally, is a planar surface formed of some metallic material/compound, such as steel. The base may be required to endure number of stresses due to large weight of the generator mounted thereon.

During the operation of the generator, the base may experience some vibrations transferred from the engine and/or the alternator. Typically, the generator is supported on mounts provided in the base. The mounts may help to limit/dampen the vibration transfer to the base, and thus protect the base and other components, such as complex control systems, from failure. However, the base may not have proper provisions to access the mounts for easy assembly and removal.

Further, the generators are required to have a fuel tank to supply the fuel to the engine, for running of the generator. Typically, the manufacturers provide the fuel tank as a stand alone unit, installed in some space in the base. Alternatively, some manufacturers use welded steel plates in the base to form the fuel tank.

SUMMARY

The present disclosure provides a base made of a composite material for supporting a generator. The base includes a support surface having an under side, and opposed side walls and opposed front and rear walls depending downwardly from the support surface. The opposed side walls and the front and the rear walls are angled to slope outwardly from the support surface towards a lower edge. Further, a flange is extending outwardly from the lower edge of the one or more of the opposed side walls and opposed front and rear walls. The base further includes one or more ribs extending outwardly from the under side of the support surface.

Other features and aspects of this disclosure will be apparent from the following description and the accompanying drawings.

DETAILED DESCRIPTION

Figure 1:
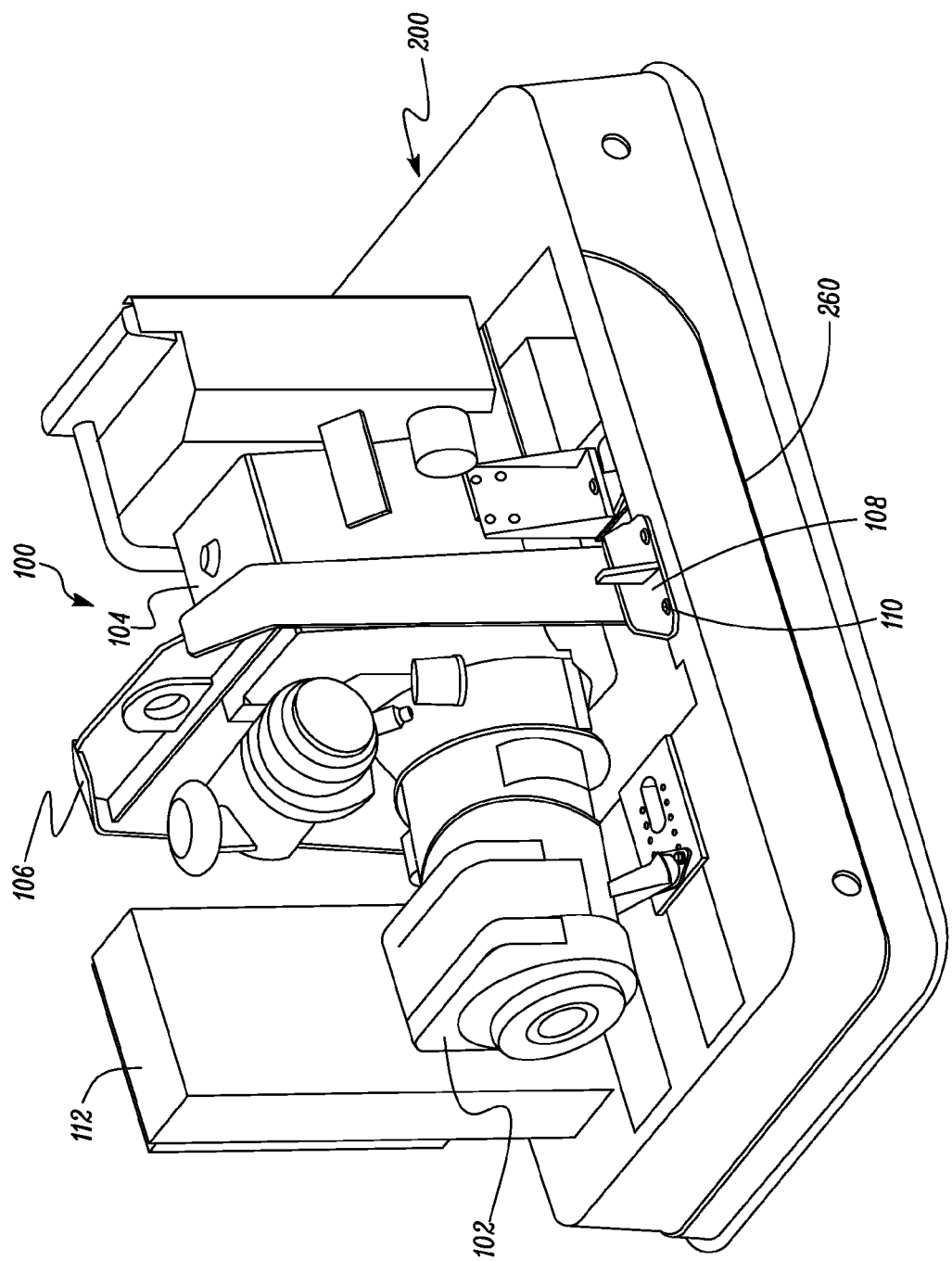
FIG. 1 illustrates a perspective representation of an exemplary generator with a base, according to the present disclosure.

The present disclosure will now be described in detail with reference being made to accompanying figures. FIG. 1 shows an exemplary embodiment of a generator 100 including a base 200, in accordance with an embodiment of the present disclosure. The generator 100 may include, but not limited to, an electric machines, motors, induction devices, or the like. The generator 100 may include an alternator 102 driven by a prime mover 104, such as a spark-ignited or compression-ignited reciprocating piston engine or a diesel or natural gas powered turbine engine.

The base 200 may be shaped to receive components of the generator 100 that are to be mounted thereon. Further, a lifting frame 106 for the generator 100 may be disposed on the base. The lifting frame 106 may be mounted on the base 200 via a bracket 108 using one or more fasteners 110. The lifting frame 106 may facilitate lifting of the generator 100 with the base 200 while transporting and/or moving. Further, the lifting frame may also support an enclosure (not shown) for the generator 100. The base 200 may also be configured to provide a support for a control panel 112 associated with the generator 100.

Figure 2:
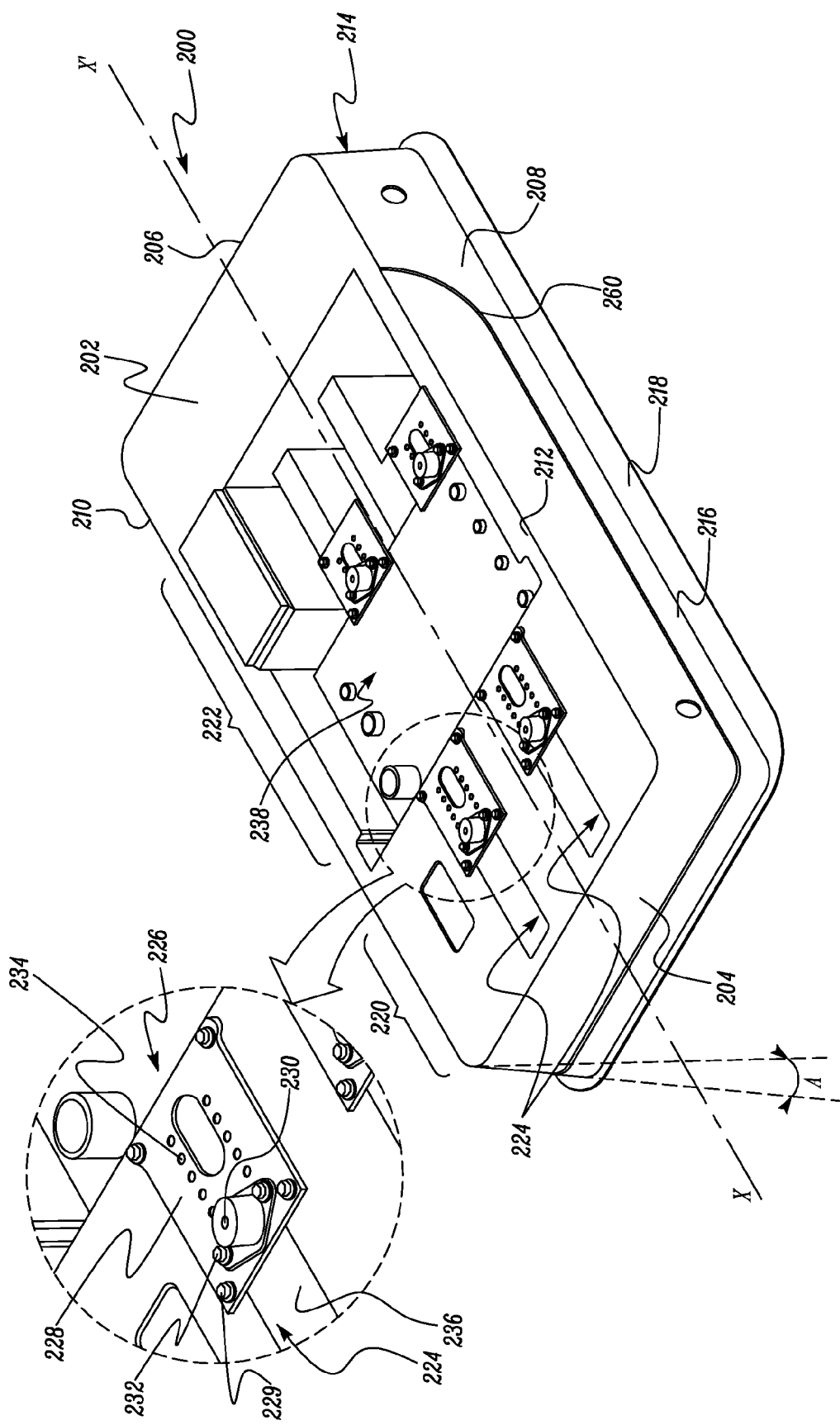
FIG. 2 illustrates a perspective view of the base of FIG. 1.

FIG. 2 illustrates a perspective view of the base 200, according to an embodiment of the present disclosure. The base 200 may be made from a composite material. For example, the base 200 may be made of Dicyclopentadiene (DCPD) which is known to have high corrosion resistance, high heat resistance, high impact resistance, high stiffness, high chemical resistance and high rigidity. Further, this material is easily moldable and paintable which helps to impart structural and aesthetic characteristics to the base 200. Alternatively, the base 200 may be formed of a rigid thermoset polymeric material. It will be appreciated that the base 200 may be molded as an integral one piece structure or multiple pieces, as desired or necessary. It further will be appreciated that other materials may be used to construct the base 200, for example a suitable material, such as, steel, thermoset polymers, such as, Glass Reinforced Plastic (GRP) or the like.

As illustrated in the FIG. 2, the base 200 includes a support surface 202 extending along a longitudinal axis XX'. In the illustrated embodiment, the support surface 202 has a rectangular shape with rounded corners. However, it may be contemplated, that the support surface 202 may have any other suitable shape based on the design and size requirements of the generator 100. For example, in various other embodiments, the support surface 202 may have square, oval, circular or any suitable polygonal shape.

Further, the base 200 may include a pair of opposed first side wall 204 and second side wall 206, and a pair of opposed front wall 208 and a rear wall 210, depending downwardly from a periphery 212 of the support surface 202. Hereinafter, the walls 204, 206, 208, 210 may be collectively referred to as a skirt 214 for the purpose of the further description. As may be contemplated, the support surface 202 and the skirt 214 together form the base 200, as a monolithic structure. A person ordinarily skilled in the art may understand that, the support surface 202 and the skirt 214 may be casted together to form the base 200. Alternatively, the support surface 202 and the skirt 214 may be manufactured separately, and later joined together by any suitable means known in the art, such as, fasteners, welding, rivets, or adhesive.

In an embodiment, the skirt 214 may depend downwardly from the support surface 202 in an angled manner. For example, the skirt 214 may have a draft angle A from the support surface 202 towards a lower edge 216 of the skirt 214. In an exemplary configuration, the draft angle A may be the range of about 2-10 degrees, relative to a plane lying normal to the support surface. The angled skirt 214 may provide better weight distribution and stiffness for the base 200, while the components of the generator 100 are placed thereon. Moreover, the angled skirt 214 may also aid in manufacturing by allowing easier removal of the base 200, from the mould, during the casting process.

Further, a flange 218 may extend outwardly from the skirt 214 of the base 200. In particular, the flange 218 may be extending from the lower edge 216 of the skirt 214. The flange 218 may act as the ground engaging member for the base 200, and provide increased rigidity and stability to the base 200.

The support surface 202 may be generally planar, but profiled in places to define various levels and features. In an embodiment, the support surface 202 may include one or more tiers based on the requirements. For instance, the support surface 202 may include a first tier 220 and a second tier 222. The first tier 220 and the second tier 222 may extend along different horizontal planes. In the exemplary arrangement, as shown in conjunction of FIGS. 1 and 2, the alternator 102 is supported on the first tier 220 and the prime mover 104 is being rested on the second tier 222. This allows for the alignment of the drive shaft (not illustrated) of the prime mover 104 with respect to the driven shaft (not illustrated) of the alternator 102, which may be disposed at different vertical heights with respect to each other.

Referring again to FIG. 2, the base 200 may include one or more access pockets 224 formed in the support surface 202. The access pockets 224 may comprise depressions in the support surface 202 located at the mounting positions of the alternator 102 and the prime mover 104. In an exemplary configuration, the access pocket 224 may be rectangular in shape, extending along the longitudinal axis XX'. In an embodiment, the base 200 may also include one or more mounting members 226 secured to the support surface 202. Each of the mounting member 226 may be located over and at least partially covering a respective access pocket 224. In an alternative arrangement, two or more mounting members 226 are located over each access pocket 224.

According to an embodiment, the mounting member 226 may include a plate 228 having opposite sides fixed to the support surface 202. The plate 228 may be fixed in a manner such that the mounting member 226 is located over and bridges the access pocket 224. The plate 228 may be fixed to the support surface 202 by means of first set of fastening members 229, such as, but not limited to, nuts and bolts.

The mounting member 226 may further include one or more mounts 230, which may be made of some resilient material, such as, rubber. According to an embodiment of the present disclosure, the mounts 230 may be anti-vibration mounts (AVM's), which limit and dampen the vibration transfer, during the operation of the alternator 102 or the prime mover 104, to the base 200. The mount 230 may be attached to the plate 228 by using second set of fastening members 232, which are configured to be received in apertures 234 provided on the plate 228. As may be contemplated that, the apertures 234 may allow the mount 230 to be positioned at different locations on the plate 228. This enables the mount 230 to be adaptable for securing the alternator 102 and/or the prime mover 104 of different sizes on the support surface 202 of the base 200.

As illustrated in the exemplary embodiment of FIG. 2, the base 200 may include a first set of the mounting members 226 disposed over the first tier 220 of the support surface 202, and a second set of the mounting members 226 disposed over the second tier 222 of the support surface 202. The first and the second sets of the mounting members 226 may be configured to support the alternator 102 and the prime mover 104, respectively, when the generator 100 is mounted over the base 200.

Further, in an embodiment, a portion of each access pocket 224 remains uncovered by the plate 228, to define an opening 236. Alternatively, the plate 228 may be disposed so as to define two openings 236, arranged in different orientations. As evident, the opening 236 may allow access to underneath of the mounting member 226, or specifically the plate 228, while the mounting member 226 is fixed over the support surface 202. This provides the clearance to tighten or loosen the mounts 230 to the plate 228, in the respective mounting members 226. It may be understood that in such arrangement, the access pockets 224 and the corresponding mounting members 226 may be sized and positioned accordingly, such that an easy access to underneath of the plate 228 is made possible.

Figure 3:
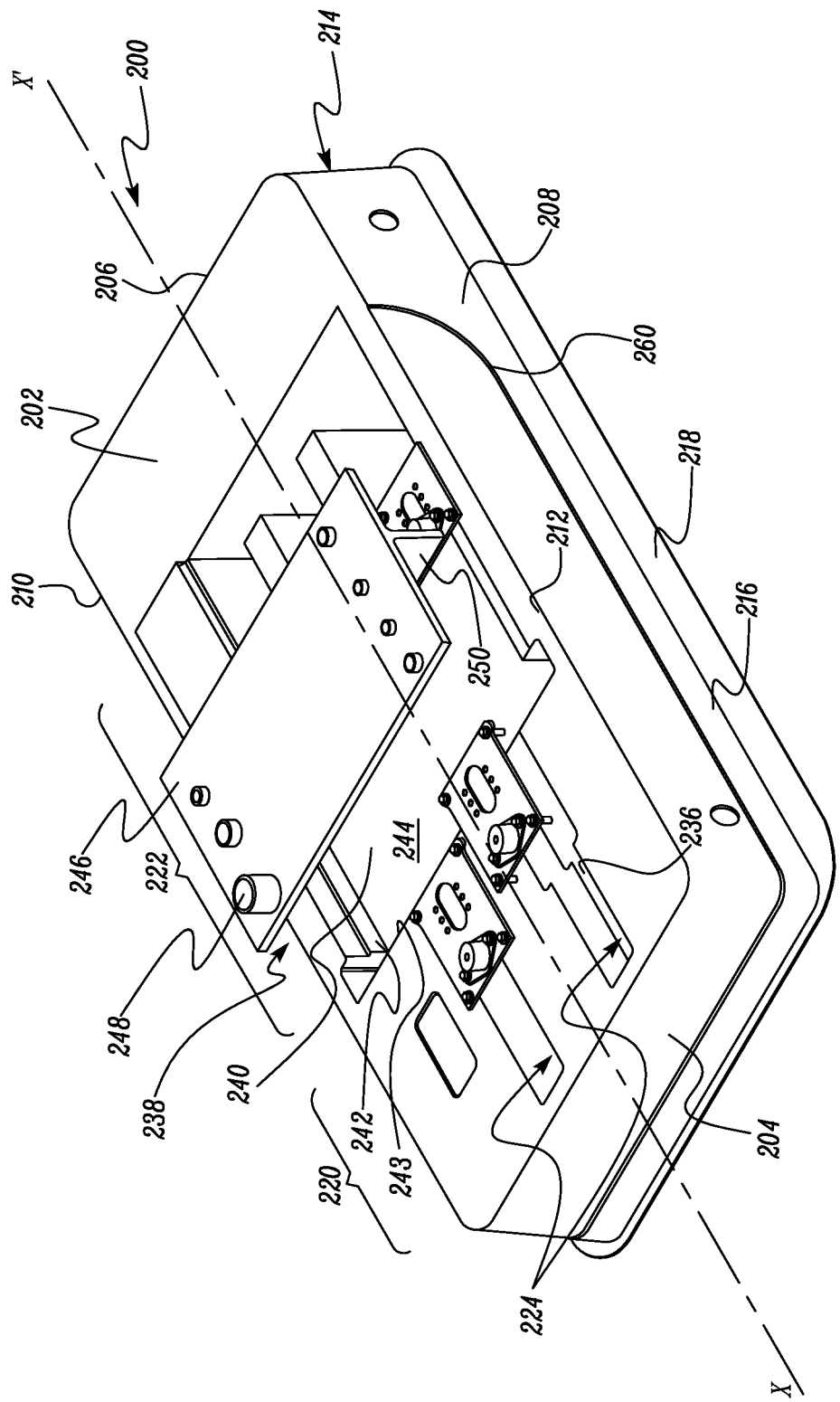
FIG. 3 illustrates a perspective view of the base with a lid in a raised position.

Further, as illustrated in FIGS. 2 and 3, the base 200 may also incorporate a fuel tank 238 therein. The fuel tank 238 may primarily include a recess 240 formed integrally during manufacturing/casting of the base 200. As illustrated, the recess 240 may include one or more secondary side walls 242, one or more secondary end walls 243 and a bottom wall 244. Further, the fuel tank 238 may include a lid 246 configured to be detachably mounted to the support surface 202 of the base 200. The lid 246 may be designed and adapted to be arranged, such that to close the recess 240. It may be evident that in FIG. 3, the lid 246 has been shown raised from the support surface 202 to illustrate the recess 240.

According to an embodiment, the lid 246 may be made of metal, such as steel. The lid 246 may be sealed around the edge of the recess 240 using a suitable adhesive and/or some mechanical fasteners, known in the art. In a further embodiment, the lid 246 may include various inlet and outlet ports 248 secured thereon, to allow for supply and transfer of the fuel. The lid 246 may also incorporate a baffle 250 configured to define/separate a fuel feed chamber and a return flow chamber in the recess 240, in the fuel tank 238. The baffle 250 may, therefore, helps to avoid mixing of the fuel in the fuel tank 236.

Figure 4:
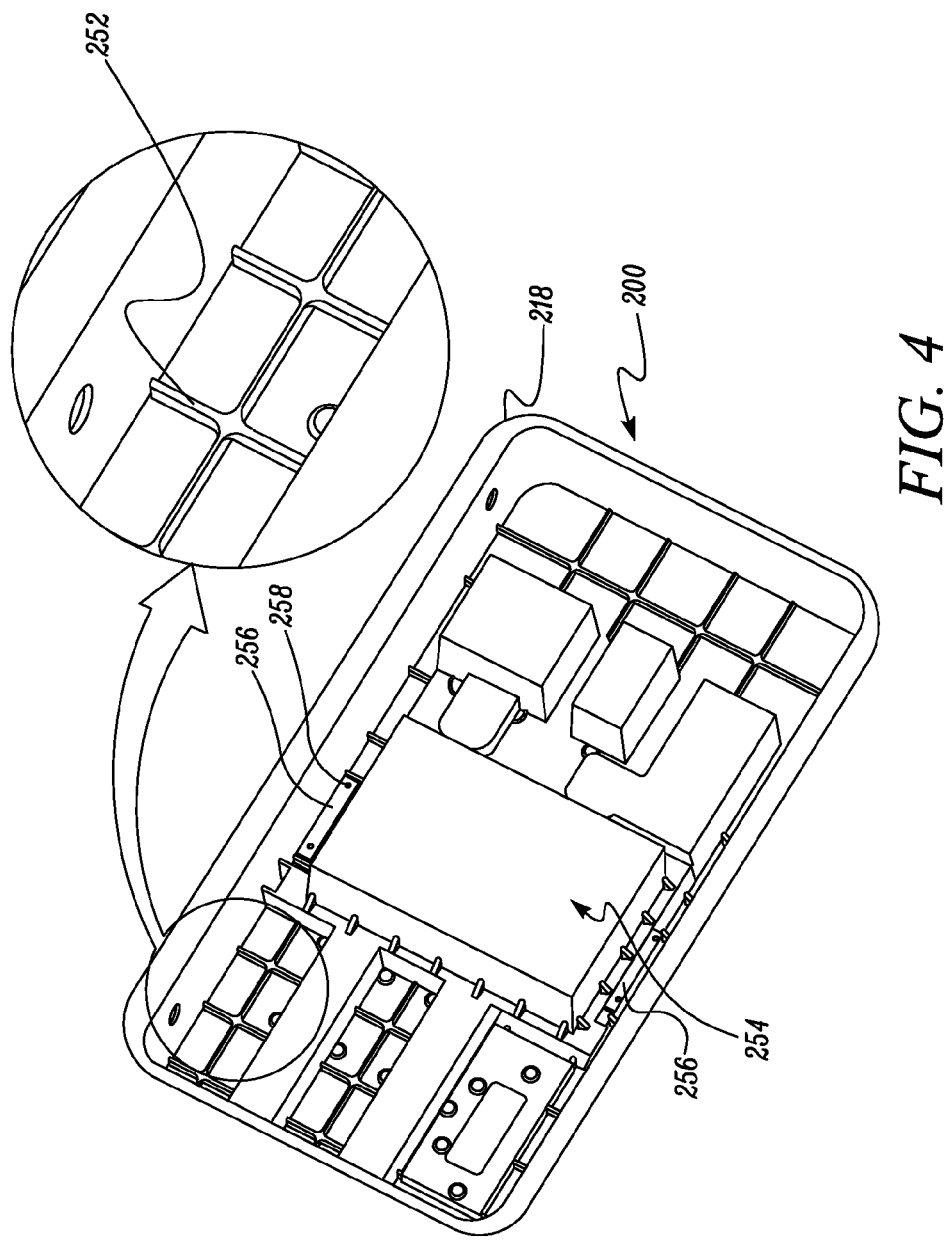
FIG. 4 illustrates a bottom perspective view of the base.

Referring now to FIG. 4, the base 200 may include ribs 252 formed on an under side 254 of the support surface 202. The ribs 252 may extend outwardly from the under side 254 to a certain predetermined depth. The ribs 252 may be provided, where the stress concentration due to the weight of the generator 100 is relatively high, in the base 200. The ribs 252 may provide additional stiffness and better weight distribution to the base 200. In an exemplary configuration, the ribs 252 may have a thickness in a range of about 5 millimeters to 50 millimeters. Further, the ribs 252 may have a depth in a range of about 20 millimeters to 100 millimeters.

According to an embodiment, the ribs 252 may be arranged in some predetermined pattern. For example, the base 200 may include one set of ribs 252 parallel to the side walls 204, 206 and other set of ribs 252 parallel to the front and rear walls 208, 210, and the two sets of ribs 252 being orthogonal to each other, intersecting in between to form a wire mesh like pattern. It will be appreciated that the number and arrangement of ribs 252 may be considered merely exemplary, as greater or lesser number of ribs 252 may be employed and in differing configurations.

Further, in an embodiment, the base 200 may include a support plate 256 mounted to the under side 254 of the support surface 202. The support plate 256 may be made of steel, and include holes 258 disposed therein. The holes 258 may be configured to receive the fasteners 110 to fix the lifting frame 106 to the base 200. The support plate 256 may provide additional strength for the base 200 to support the lifting frame 106, which may be subjected to large forces when the generator 100 is lifted from thereon.

The base 200 may have other design features, such as a witness line 260, as illustrated in FIG. 1-3, disposed in one or more walls of the skirt 214. The witness line 260 may enhance the aesthetics of the base 200. Further, in various embodiments, the base 200 may include numerous struts (not illustrated) to provide better weight distribution of the generator 100 mounted thereon. The base 200 may further include guides (not illustrated) disposed at the under side 254. The guides may help to engage the base 200 with some corresponding means in the carrying vehicle to facilitate transportation of the generator 100. The base 200 may also incorporate a drain (not illustrated) to channel the water collected thereon. It may be contemplated that, the base 200 may not be limited to the specific structure or configuration shown, so long as the base 200 may maintain its support, transport, installation, and removal functionality.

INDUSTRIAL APPLICABILITY

The industrial applicability of the apparatus described herein will be readily appreciated from the foregoing discussion. The present disclosure provides the base 200 which is made from composite materials and includes various features to aid in manufacturing and to save costs, as described herein. In an aspect of the present disclosure, the mounts 230 may be easily accessed via the access pockets 224. An operator may access the bottom of the plate 228 from the opening 236, to manipulate the corresponding mount 230 based on the requirement.

Further, the mounts 230 may be adjusted to position the generator 100 on the support surface 202 by moving them along the various apertures 234 on the plate 228. This may be achieved as an operator may loosen the second set of fastening member 232 from one of the apertures 234, and tighten the same fastening member 232 to other of the apertures 234, to re-position the mount 230 based on the requirement. Further, the alternator 102 and/or the prime mover 104 may be positioned accordingly on the re-positioned mounts 230.

The present disclosure incorporates the fuel tank 238 into the base 200, as a part of the molding process. This may result in significant cost savings and hassles of separately providing a fuel tank. The ports 448 provided on the lid 246 may allow for the flow of fuel into/out of the fuel tank 236. The operator may install the supply line for the fuel with one of the ports 248, which may later be supplied for the prime mover 104 by another port 248.

Further, the ribs 252 provided in the base 200 may provide additional stiffness to the base 200. The ribs 252 may provide better weight distribution in the base 200, and therefore helps to reduce stress concentration and avoid possible failure of the base 200 due to the concentrated weight of the generator 100 mounted thereon.

Although the embodiments of this disclosure as described herein may be incorporated without departing from the scope of the following claims, it will be apparent to a person skilled in the art that various modifications and variations to the above disclosure may be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A base made of a composite material for supporting a generator, the base comprising:
   a support surface having an under side, wherein the support surface includes a first tier and a second tier disposed in different horizontal planes with respect to each other, and wherein the first tier of the support surface supports an alternator of the generator and the second tier of the support surface supports a prime mover of the generator;
   opposed side walls and opposed front and rear walls depending downwardly from the support surface, the opposed side walls and the front and the rear walls being angled to flare outwardly from the support surface towards a lower edge;
   a flange extending outwardly from the lower edge of one or more of the opposed side walls and opposed front and rear walls; and
   one or more ribs extending outwardly from the under side of the support surface.

2. The base of claim 1, wherein the ribs have a thickness in a range of 5 millimeters to 50 millimeters.

3. The base of claim 1, wherein the ribs have a depth in a range of 20 millimeters to 100 millimeters.

4. The base of claim 1, wherein the one or more ribs include a set of ribs disposed substantially parallel to the side walls and a set of ribs disposed substantially parallel to the front and rear walls.

5. The base of claim 4, wherein the two sets of ribs are intersecting each other.

6. The base of claim 1, wherein the ribs are defined in the under side of the base in regions adapted to bear substantial weight of the generator.

7. The base of claim 1, wherein the composite material for the base is Dicyclopentadiene.

8. The base of claim 1, wherein the first tier and the second tier are disposed in different horizontal planes based on a relative height difference between the alternator and the prime mover, to aid for the alignment of the alternator and the prime mover.

9. The base of claim 1, wherein one or more of the side walls and the front and the rear walls have a draft angle in the range of 2-10 degrees with respect to an orthogonal plane to the support surface.

10. A generator assembly, comprising:
    an alternator;
    an engine; and
    a base on which the alternator and the engine are mounted, the base comprising:
       a support surface having an under side, wherein the support surface includes a first tier and a second tier disposed in different horizontal planes with respect to each other, wherein the first tier of the support surface supports the alternator and the second tier of the support surface supports the engine such that a drive shaft of the alternator is aligned with a drive shaft of the engine;
       opposed side walls and opposed front and rear walls depending downwardly from the support surface, the opposed side walls and the front and the rear walls being angled to flare outwardly from the support surface toward a lower edge;
       a flange extending outwardly from the lower edge of one or more of the opposed side walls and opposed front and rear walls; and
       one or more ribs extending outwardly from the under side of the support surface.

11. The generator assembly of claim 10, wherein the ribs have a thickness in a range of 5 millimeters to 50 millimeters.

12. The generator assembly of claim 10, wherein the ribs have a depth in a range of 20 millimeters to 100 millimeters.

13. The generator assembly of claim 10, wherein the one or more ribs include a set of ribs disposed substantially parallel to the sidewalls and a set of ribs disposed substantially parallel to the front and rear walls.

14. The generator assembly of claim 10, wherein the ribs are defined in the under side of the base in regions adapted to bear a substantial weight of the alternator and the engine.

15. The generator assembly of claim 10, further including a fuel tank mounted on the base.

16. The generator assembly of claim 10, further including a control panel associated with the alternator and the engine, the control panel being mounted on the base.

17. A generator assembly, comprising:
   an alternator;
   an engine;
   a control panel;
   a fuel tank;
   a lifting frame; and
   a base on which the alternator, the engine, the control panel, the fuel tank, and the lifting frame are mounted, the base comprising:
      a support surface having a top side on which at least the alternator and the engine are mounted, and an under side;
      opposed side walls and opposed front and rear walls depending downwardly from the support surface, the opposed side walls and the front and the rear walls being angled to flare outwardly from the support surface towards a lower edge;
      a flange extending outwardly from the lower edge of one or more of the opposed side walls and opposed front and rear walls; and
      one or more ribs extending outwardly from the under side of the support surface, and wherein the support surface includes a first tier and a second tier disposed in different horizontal planes with respect to each other, wherein the first tier of the support surface supports the alternator and the second tier of the support surface supports the engine such that a drive shaft of the alternator is aligned with a drive shaft of the engine.

\* \* \* \* \*